Figures 1, 2:
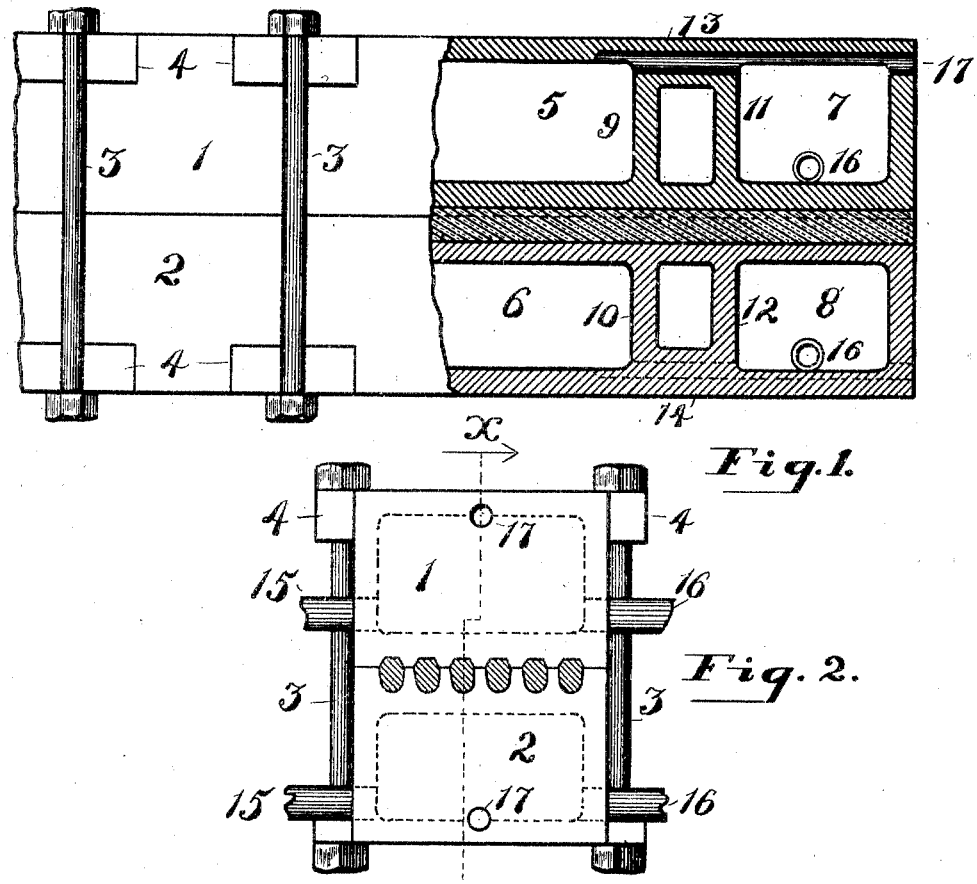

No. 776,979. PATENTED DEC. 6, 1904.
J. K. WILLIAMS.
VULCANIZER.
APPLICATION FILED SEPT. 30, 1904.
NO MODEL.

Witnesses:
Inventor.
J. K. Williams
by C. E. Humphrey
Atty.

No. 776,979. Patented December 6, 1904.

UNITED STATES PATENT OFFICE.

JOHN K. WILLIAMS, OF AKRON, OHIO, ASSIGNOR OF ONE-HALF TO THE WILLIAMS FOUNDRY & MACHINE COMPANY, OF AKRON, OHIO.

VULCANIZER.

SPECIFICATION forming part of Letters Patent No. 776,979, dated December 6, 1904.

Application filed September 30, 1904. Serial No. 226,662. (No model.)

*To all whom it may concern:*

Be it known that I, JOHN K. WILLIAMS, a citizen of the United States, residing at Akron, in the county of Summit and State of Ohio, have invented a certain new and useful Improvement in Vulcanizers, of which the following is a complete specification.

My invention relates generally to vulcanizers, and has especial relation to devices to be used in connection therewith.

The common form of vulcanizers for long-length articles embodies two boxes or members arranged to register with each other and having through their abutting faces longitudinal grooves partly in each member into which the material to be vulcanized is placed. These members are provided with chambers into which a heating medium is introduced to cause vulcanization, and the two are clamped together by suitable clamping devices during the process. These vulcanizers being limited in length are only capable of producing indefinite lengths of material—such as tires, hose, &c.—by recourse to the following method, which consists in placing in the vulcanizer-cavities strips of material which protrude considerably from one end, and which ends are not cured with the portion in the vulcanizer, but remain green. Each strip is removed after curing and the green unvulcanized end inserted into the opposite end of the vulcanizer and made to abut against the end of an entirely new strip of material whose end protrudes in the same manner from the vulcanizer that the first one did. The members after being clamped together again are heated, and the green end of the first strip unites during the process of curing to the end of the second strip, and all of the second strip except the protruding end is cured simultaneously with the making of the joint between the two strips. This is kept up until a strip of any desired length is obtained.

It has been found difficult to keep the protruding ends of the strips outside of the members cool enough to prevent a partial vulcanization thereof, which interferes seriously with the operation of joining the ends of the strips, and hence the object of my invention is to place on the ends of the vulcanizer members or form integral therewith suitable means to prevent this partial heating or curing of the protruding ends.

Another object of my invention is to make the cooling-chambers formed at the ends of the vulcanizer members available as heating-chambers instead of cooling-chambers where the vulcanizer is to produce single-length tires as contradistinguished from continuous-length tires.

In accomplishing the aforesaid objects I employ certain mechanism, forms of which are hereinafter described, reference being had to the accompanying drawings, which form a part hereof.

In the accompanying drawings, in which similar reference-numerals indicate like parts in the different figures, Figure 1 is a side elevation of a vulcanizer with my cooling device, having portions thereof broken away at the line X of Fig. 2. Fig. 2 is an end elevation looking from the right of Fig 1.

The members 1 and 2 are clamped together in any preferred manner. The ordinary means used are a series of bolts 3, passing through slotted lugs 4 on the sides of the members 1 and 2.

In the members 1 and 2 are heating-chambers 5 and 6, respectively, in which a heating medium is introduced, causing vulcanization, and mold-cavities for holding the material are formed longitudinally along the abutting faces of the two members, partially in each member in the metal existing between the chambers 5 and 6.

If it is desired to make or form a cooling-chamber at the end or ends of this ordinarily-formed vulcanizer available likewise as a steam-chamber, I cast or otherwise manufacture integral with the two members 1 and 2 cooling-chambers 7 and 8, separated from the heating-chambers 5 and 6 by double walls 9 and 10 and 11 and 12. The spaces between the walls 9 and 10 and 10 and 12 constitute air-passages to assist in keeping the extended ends of the green tires cool enough to prevent partial vulcanization.

The metal existing immediately above and below the mold-cavities and which also connects the cooling-chambers 7 and 8 with the main bodies of the members of the vulcanizer is of full width with the vulcanizer members, and these chambers 7 and 8 are also held to the vulcanizer members by integral lugs 13 and 14, which need not be the full width of the vulcanizer members unless for extra strength.

Extending from either side of the cooling-chambers 7 and 8 are inlet and outlet pipes 15 and 16, by which a cooling fluid is carried into and withdrawn from the interiors of these chambers 7 and 8.

Thus it will be seen that in addition to the action of a cooling fluid, such as water, passing through the chambers 7 and 8 the air-spaces between the chambers 7 and 8 and the members 1 and 2 also assist in keeping the temperature below a vulcanizing heat in the extended ends of the tires held between the cooling-chambers 7 and 8.

Should it be desirable at any time to employ the entire vulcanizer, thus including the cooling-chambers, as a simple vulcanizer for making single-length tires, a pair of holes 17 are drilled in the ends of the heads of the chambers 7 and 8, partially in the top and bottom walls thereof, into chambers 5 and 6, and after closing the openings for the reception of the inlet and outlet pipes 15 and 16 by plugs a heating medium may be introduced through the openings 17 to fill not only the cooling-chambers 7 and 8, but also the chambers 5 and 6.

What I claim, and desire to secure by Letters Patent, is—

1. A vulcanizer consisting of mold members adapted to meet and register, each individually capable of being heated, and a cooling-chamber at the end thereof and separated from the heating-chambers by an air-space.

2. The combination of a vulcanizer having two parts arranged to meet and register and provided with mold-cavities formed in their meeting faces and cooling-chambers at their ends and separated from said parts of said vulcanizer by an intervening air-space.

3. A mold member for vulcanizers consisting of a heating-chamber and a cooling-chamber separated by an interposed air-space.

4. A mold member for vulcanizers consisting of a heating-chamber and a cooling-chamber separated by an interposed air-space, said cooling-chamber being convertible into a heating-chamber.

5. The combination in a two-part separable vulcanizer, of a cooling-chamber formed in the end thereof and means for introducing to said chamber a cooling medium.

In testimony that I claim the above I hereunto set my hand in the presence of two subscribing witnesses.

JOHN K. WILLIAMS.

In presence of—
R. T. COUSART,
C. E. HUMPHREY.